United States Patent [19]
Mourgues

[11] Patent Number: 5,041,752
[45] Date of Patent: Aug. 20, 1991

[54] APPARATUS FOR DETECTING AND SIGNALLING THE FALL OF BODIES IN WATER, PARTICULARLY SWIMMING POOLS

[75] Inventor: Eric Mourgues, Arthez De Bearn, France

[73] Assignee: Aquitaine Mecanique S.A., France

[21] Appl. No.: 478,545

[22] Filed: Feb. 12, 1990

[30] Foreign Application Priority Data

Feb. 14, 1989 [FR] France .................... 89 01859

[51] Int. Cl.⁵ .......................................... H01L 41/04
[52] U.S. Cl. .................................... 310/324; 310/345
[58] Field of Search ....................... 310/324, 345; 340/384 E, 384 R, 825.82

[56] References Cited

U.S. PATENT DOCUMENTS

| | | | |
|---|---|---|---|
| 2,430,013 | 11/1947 | Hansell | 310/324 |
| 2,942,247 | 6/1960 | Lienau et al. | 340/566 |
| 4,054,808 | 10/1977 | Tanaka | 310/323 |
| 4,374,377 | 2/1983 | Saito et al. | 340/384 E |
| 4,533,907 | 8/1985 | Thatcher | 340/565 |
| 4,704,894 | 11/1987 | Inuzuka et al. | 310/326 |

FOREIGN PATENT DOCUMENTS 2802694 7/1979 Fed. Rep. of Germany ... 340/384 E
3006654 9/1981 Fed. Rep. of Germany .

*Primary Examiner*—Mark O. Budd
*Assistant Examiner*—Thomas M. Dougherty
*Attorney, Agent, or Firm*—Ostrolenk, Faber, Gerb & Soffen

[57] ABSTRACT

An apparatus is provided for signalling the falling of bodies in water, comprising a piezo-electric cell for detecting frequency waves less than or equal to 5 Hz and comprising, in a case, a sensor formed of a membrane and a piezo-electric cell connected to a signal amplification and management circuit, in which the effects produced by disturbing frequencies not representative of bodies falling in water, are eliminated, wherein the effects produced by disturbing frequencies are eliminated by dumping or attenuating the frequencies higher the 5 Hz by placing, in the center between membrane 2 and the piezo-electric element 4, an elastomer disk 11 with a Shore hardness between 20 and 25 and forming an elastomer bridge.

6 Claims, 4 Drawing Sheets

5,041,752

APPARATUS FOR DETECTING AND SIGNALLING THE FALL OF BODIES IN WATER, PARTICULARLY SWIMMING POOLS

BACKGROUND OF THE INVENTION

Swimming pools without supervision present a danger particularly for children having free access to the sides of the swimming pools.

Every year the number of victims of accidental drowning in swimming pools are to be deplored, especially in family swimming pools, whether such drowning is caused by an accidental fall of the child or by deliberate immersion when adults are not in the immediate vicinity.

The need has then made itself felt of providing supervision of swimming pools by reliable means outside authorized bathing periods during which children are supposed to be supervised by adults.

The apparatus concerned comprises a case, a membrane and a piezo-electric cell for detecting frequency waves less than or equal to 5 Hz and connected to a signal amplification and management circuit. In fact, a fall in water gives rise to sound or subsonic waves whose frequency spectrum is limited to the range less than or equal to 5 Hz.

It is therefore desirable for the detector to take into account exclusively the frequency band mentioned so as to exclude as completely as possible all the frequencies which may be transmitted to the detector from other sources than persons falling in water.

Detectors are known for detecting the fall of objects in water, in which elimination of the electric signals due to disturbing frequencies not representative of falls in water is provided by means of a electronic filtering circuits.

SUMMARY OF THE INVENTION

The invention provides an apparatus of the above-mentioned type in which the frequencies are filtered by an extremely simple means without requiring electronic circuits whose reliability alters during use.

In an apparatus according to the invention for detecting and signalling the immersion of bodies in water comprising a piezo-electric cell for detecting frequency waves less than or equal to 5 Hz and comprising, in a case, a sensor formed of a membrane and a piezo-electric cell connected to a signal amplification and management circuit, in which the effects produced by disturbing frequencies not representative of bodies falling in water, are eliminated. The effects produced by disturbing frequencies are eliminated by damping or attenuating the frequencies higher than 5 Hz by placing, in the centre between membrane 2 and the piezo-electric element 4, an elastomer disk 11 with a Shore hardness between 20 and 25 and forming an elastomer bridge.

Thus, the vibrations occurring in the membrane of the detector are transferred to the plate of the piezo-electric element through the elastomer bridge which, by its nature and composition, transmits the band of frequencies less than or equal to 5 Hz as a whole and damps or attenuates the disturbing frequencies. The elastomer bridge therefore provides a selection of the chosen frequency range.

The choice of the elastomer bridge depends on the parameters such for example as the hardness of the elastomer and those related to its geometry, namely its thickness and the ratio between the area of the bridge and that of the plate of the piezo-electric element. Preferably, this surface ratio is about 0.2.

Advantageously, the bridge is formed by a disk about 8 mm in diameter and about 0.5 mm in thickness from an elastomer having a Shore A hardness of about 20.

According to another important characteristic of the invention, the membrane is integral with the case, whereas the edges of the plate of the piezo-electric element are inserted solidly in the body of the case so that the case, forming an acoustic bridge, transmits to the whole of the parts of the sensor the vibrations received from external sources other than water, the membrane being thus in static equilibrium and transmits no deformation to the piezo-electric element.

In fact, when the plate and the membrane are firmly held in the body of the case, the vibrations due to the external medium other than water are transmitted as a whole through this acoustic bridge formed by the case to all the parts of the sensor, so that the membrane undergoes no deformation. The membrane is thus in static equilibrium and records no deformation. In this case it transmits no vibration to the piezo-electric element with which it is further connected mechanically by the elastomer bridge.

When the cause of the vibrations comes from the water, so from the fall of a body, only the membrane, to the exclusion of the case, receives vibrations, the case playing only the role of a physical support.

In this latter instance, only the deformation of the membrane is transmitted to the piezo-electric element through the elastomer bridge which plays the role of a filter by selecting the chosen frequency range.

BRIEF DESCRIPTION OF THE DRAWINGS

The invention will be illustrated by the accompanying drawings in which.

DESCRIPTION OF THE PREFERRED EMBODIMENT

Figure 1:
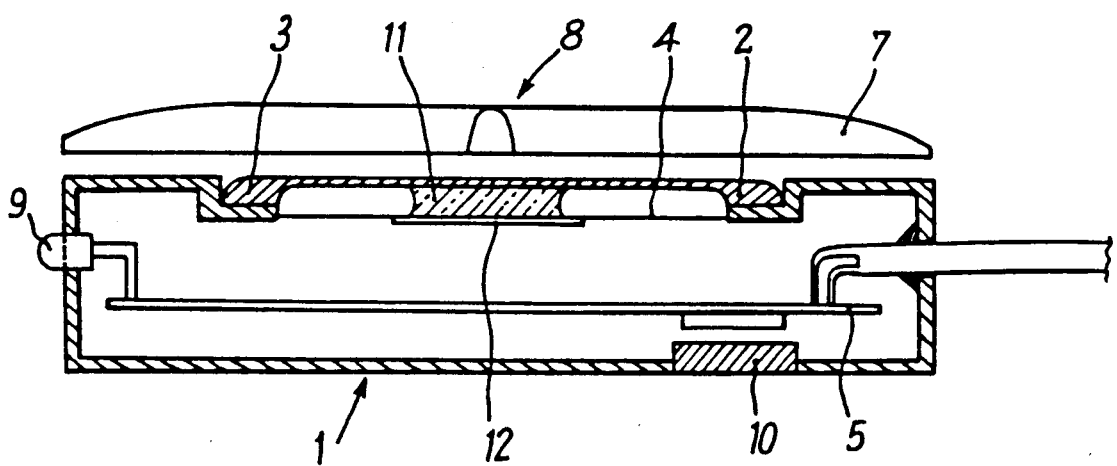
FIG. 1 shows schematically the apparatus of the invention.

On the top of the sealed case 1, which is made from molded plastic material, is sealingly and integrally mounted a deformable membrane 2 also made from a plastic material. The case is covered by a lid 7 in the central opening of which are placed fins 8 in the form of a star.

Said case has a circular flange in which a piezo-electric crystal or plate in the form of a disk 4 is inserted with slight clearance and whose circular edge is embedded so as to form an integral part with the case. On the opposite side of the piezo-electric plate is placed a sensor element 12, the piezo-electric assembly is connected by wires not shown to a printed circuit board 5, to which the electric supply and signal transmission conductors 6 lead.

An indicator light 9 connected to card 5 and serving as warning light emerges from the case for showing that the detector has functioned.

An adjustment plug 10 makes it possible to regulate the alarm tripping threshold.

The signals produced by said cell are transferred to a central signal processing unit not shown which triggers the alarm. The processing unit is fed from the electric mains and, as a precaution, by a stand-by battery.

Operation of the installation is initiated within the central unit and particularly starting and stopping thereof, possibly in a programmed sequence.

Furthermore, in addition to the stand-by indicator lamp, the central unit comprises means for actuating and stopping an alarm siren and for checking the correct operation of the central unit.

Centrally between membrane 2 and the piezo-electric element 4 is inserted a self-adhesive, non corrosive silicon elastomer disk 11 jammed between the two. Its Shore A hardness is from 20 to 25.

Since the variation of the pass-band depends on several parameters, the transfer function may be calculated in a given working zone. The ideal zone with respect to the filtering frequency band must correspond to the resonance damping zone.

Depending on the contact area between the elastomer on the piezo-electric disk and on the membrane, the response of the filter is different.

A contact area ratio K which is generally satisfactory is about 0.2. The piezo-electric cells which are commercially available generally having a diameter of about 40 mm, the diameter of the elastomer disk will then be 8 mm.

The operation of the filter also depends on the thickness of the elastomer. It has been chosen because of requirements to adopt a thickness of 0.5 mm, the tolerance reaching +/−10%.

In the diagram, on a scale of Shore hardnesses, an abscissa has been shown corresponding to a hardness equal to 20. The area ratio zone k is shown by a cone whose ideal ratio is the segment Z. The segments Z1 and Z2 represent respectively the ratios 0.2+/−20%, whereas the segment Zmax represents the maximum value of the ratio for a frequency pass-band less than or equal to 5 Hz.

On an ordinate axis at the left of the diagram relating to K, frequencies F have been shown in log Hz.

On another ordinate axis, the graduated damping value, from top to bottom, has been shown graphically, in a proportional response zone comprising the resonance zone and the non response zone, (filtering) comprising the "satisfactory", "good" and "excellent" damping. See FIGS. 2, 3 and 4.

This chart is to be read in the following way.

On the Shore hardness scale, the theoretical value of 20 is taken. This hardness corresponds to the desired frequency filtering range, considering the ratio of the areas (or of the diameters) established (K=0.2). With Z1 representing the tolerance K+20%, filtering was determined so that Z1 represents the maximum frequency tolerance of the filter. Thus, all signal variations whose frequency is less than 5 Hz will, on the left hand table (response zone of the elastomer), give a resonance zone, namely transmission of the signal as a whole.

Figure 3:
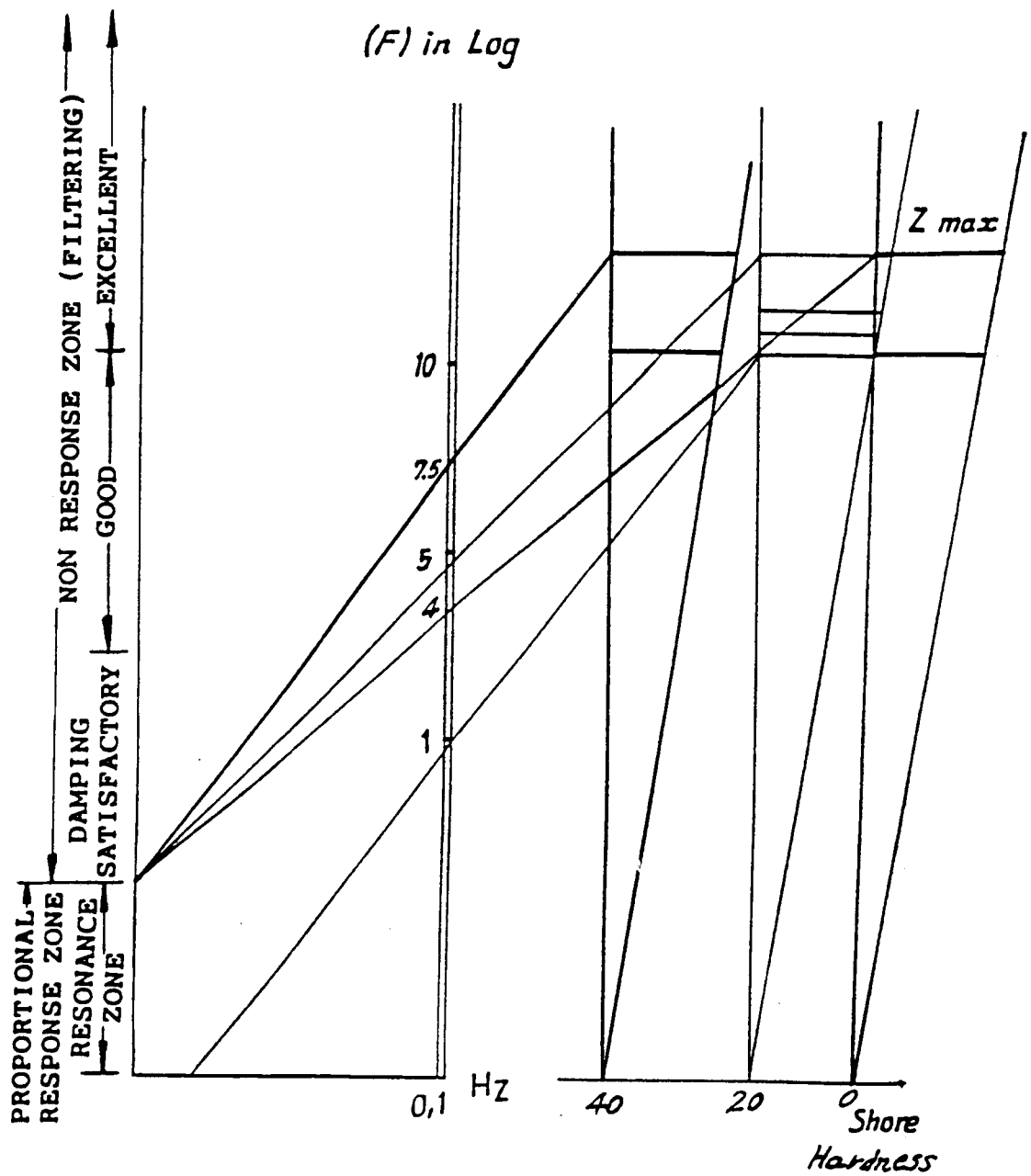
FIG. 3 shows a chart explaining the theory of operation for different hardnesses.

It can also be seen from the graph in FIG. 3 that if the Shore hardness increases, with the area ratio kept constant, the whole of the cone moves to the left along the scale towards the Shore value 40 when the filter acts in the resonance zone. Thus, at higher Shore hardness, the frequency increases.

The segments Z, Z1 and Z2 remain parallel to the axis of the abscissa. If it is desired to keep the filter in its resonance zone, it is the frequency which will be modified and, in this instance, increased. Conversely, if the Shore hardness decreases, the filtering frequency also decreases. The elastomer bridge is formed from silicon elastomer in the form of a sealed tube by depositing a nut of the calibrated product on the piezo-electric disk and ABS adhesive on the membrane. The filter is created by crushing the silicon nut between the two elements so as to give it a thickness of about 0.5 mm.

Figure 2:
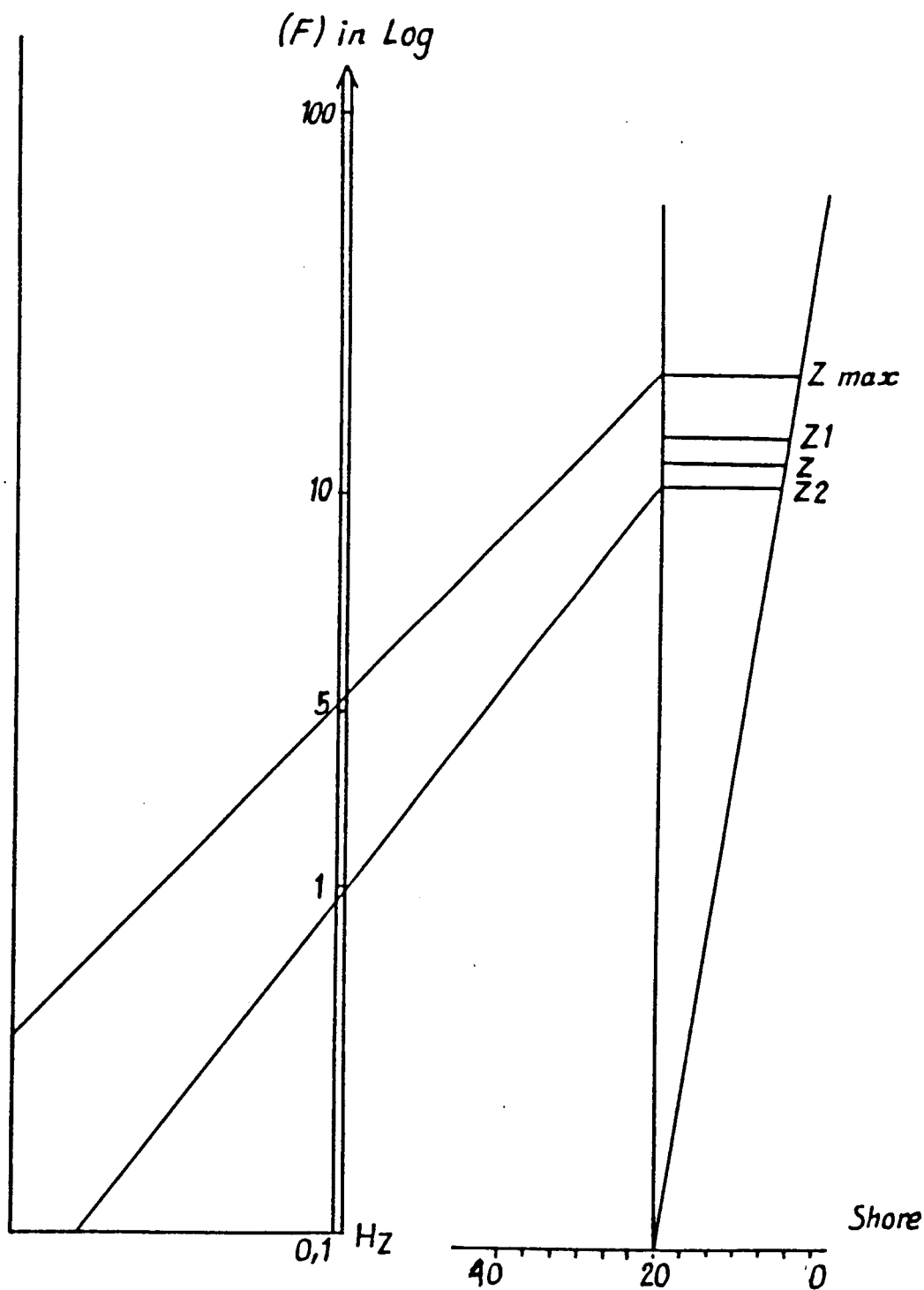
FIG. 2 shows a chart relating to the elements in choosing the elastomer bridge as a function of its parameters.
Figure 4:
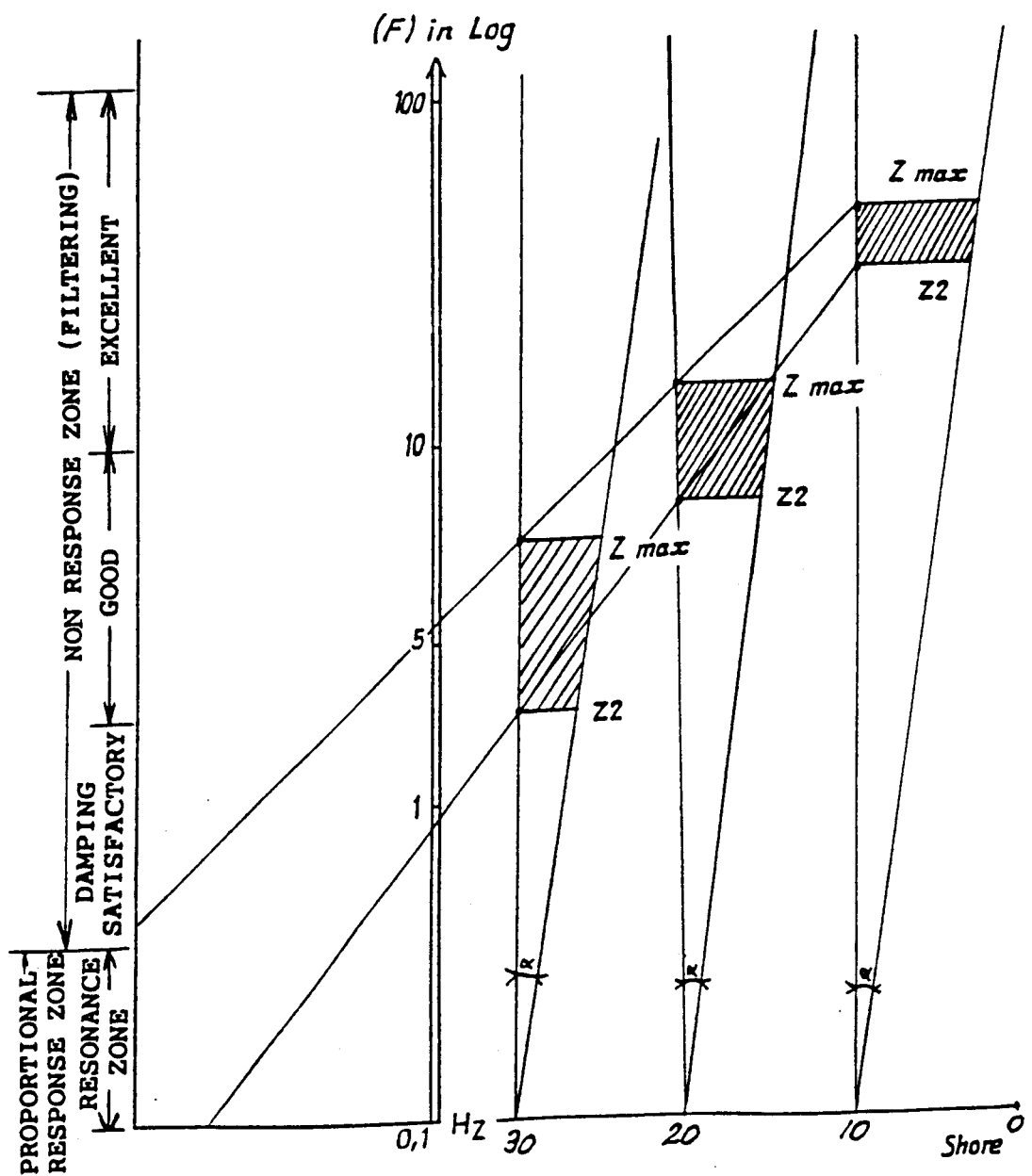
FIG. 4 shows a chart explaining the theory of operation for different thicknesses or heights of the elastomer disk.

The theory of operation is further explained in FIGS. 2, 3 and 4.

The segments Z, and particularly Zmax, Z1, Z and Z2 represent the values of the ratio K of the areas of the elastomeric disk on the one hand and of the piezo-electric element on the other hand. Zmax is the upper limit. For values above that limit, the transmitted frequencies do not fall in the desired resonance frequency range, namely 5 Hz. In FIG. 2, this range is indicated as the resonance zone.

Z represents the optimal value of K, e.g. 0.2. Z1 and Z2 are the production or manufacturing tolerance limits for K, e.g. 0.2±20%. although Z corresponds to the optimum attenuation of frequencies higher than 5 Hz, however, Z1 and Z2 are acceptable ratios for fair acceptable attenuation.

FIG. 3 is a modification of FIG. 2.

FIG. 4 explains the theory of how the shape of the elastomeric disk and the area ratio K vary, when using elastomers having varying Shore hardnesses, 10, 20 and 30 being illustrated, while the filtering frequency limit is kept constant, e.g. at 5 Hz. The production tolerance limits, represented by the angel $\alpha$, are kept constant. The hatched blocks have horizontal upper and lower borders in the segments Zmax and Z2 which represent the area ratio K. The length of the vertical border is proportional to the thickness of the elastomeric disk, so that each disk toward the left in FIG. 4 is thicker, and the surface of the block in the drawing is proportional to the contact area between the disk and the piezo-electric element. To achieve the desired filtering frequency limit constant, a higher Shore hardness is associated with a thicker elastomeric disk. To obtain the desired attenuation of frequencies higher than 5 Hz, the thickness of the elastomeric disk is thin for elastomers having a lower Shore hardness and thicker for those having a higher Shore hardness, while the area ratio K is larger for the high Shore hardness and smaller for the low Shore hardness. From a practical point of view, the middle value of the Shore hardness gives acceptable results, medium values for the thickness and for the area ratio.

The invention is not limited to the embodiment described, it is susceptible of numerous variants within the scope of a man skilled in the art and as a function of the chosen pass-band value.

What is claimed is:

1. An apparatus for detecting and signalling the immersion of bodies in water, comprising a piezo-electric cell for detecting frequency waves less than or equal to 5 Hz and comprising a case, within the case a sensor formed comprised of a membrane and a piezo-electric element connected to a signal amplification and management circuit, and means for eliminating the effects produced by disturbing frequencies not representative of bodies falling in water by attenuating the frequencies higher than 5 Hz the means comprising an elastomer disk placed in the center between the membrane and the piezo-electric element, the elastomer disk having a Shore hardness between 20 and 25 and forming an elastomer bridge.

2. The apparatus as claimed in claim 1, wherein the thickness and the hardness of the elastomer forming the bridge, as well as the ratio of the areas of the disk and of the piezo-electric element form parameters for choosing the desired eliminating.

3. The apparatus as claimed in claim 1, wherein the ratio of the areas of the disk and of the piezo-electric element is about 0.2.

4. The apparatus as claimed in claim 3, wherein said elastomer bridge is formed by a disk about 8 mm in diameter and about 0.5 mm in thickness made from an elastomer having a Shore A hardness of about 20.

5. The apparatus as claimed in claim 1, wherein the membrane is integral with the case, and the edges of the plate of the piezo-electric element are inserted solidly in the body of the case so that the case, forming an acoustic bridge, transmits to the whole of the parts of the sensor the vibrations received from external sources other than water, the membrane being thus in static equilibrium and transmitting no deformation to the piezo-electric element.

6. An apparatus for detecting and signalling the immersion of bodies in water, comprising a piezo-electric cell for detecting frequency waves less than or equal to a predetermined frequency and comprising a case, within the case a sensor comprised of a membrane and a piezo-electric element connected to a signal amplification and management circuit, and means for eliminating the effects produced by disturbing frequencies not representative of bodies falling in water by attenuating the frequencies higher than the predetermined frequency, the means comprising an elastomer disk placed in the center between the membrane and the piezo-electric element, the disk having a Shore hardness in a predetermined range and forming an elastomer bridge, wherein the thickness and the hardness of the elastomer forming the bridge and the ratio of the areas of the disk and of the piezo-electric element form parameters for choosing the effects to be eliminated.

* * * * *